Patented Aug. 12, 1947

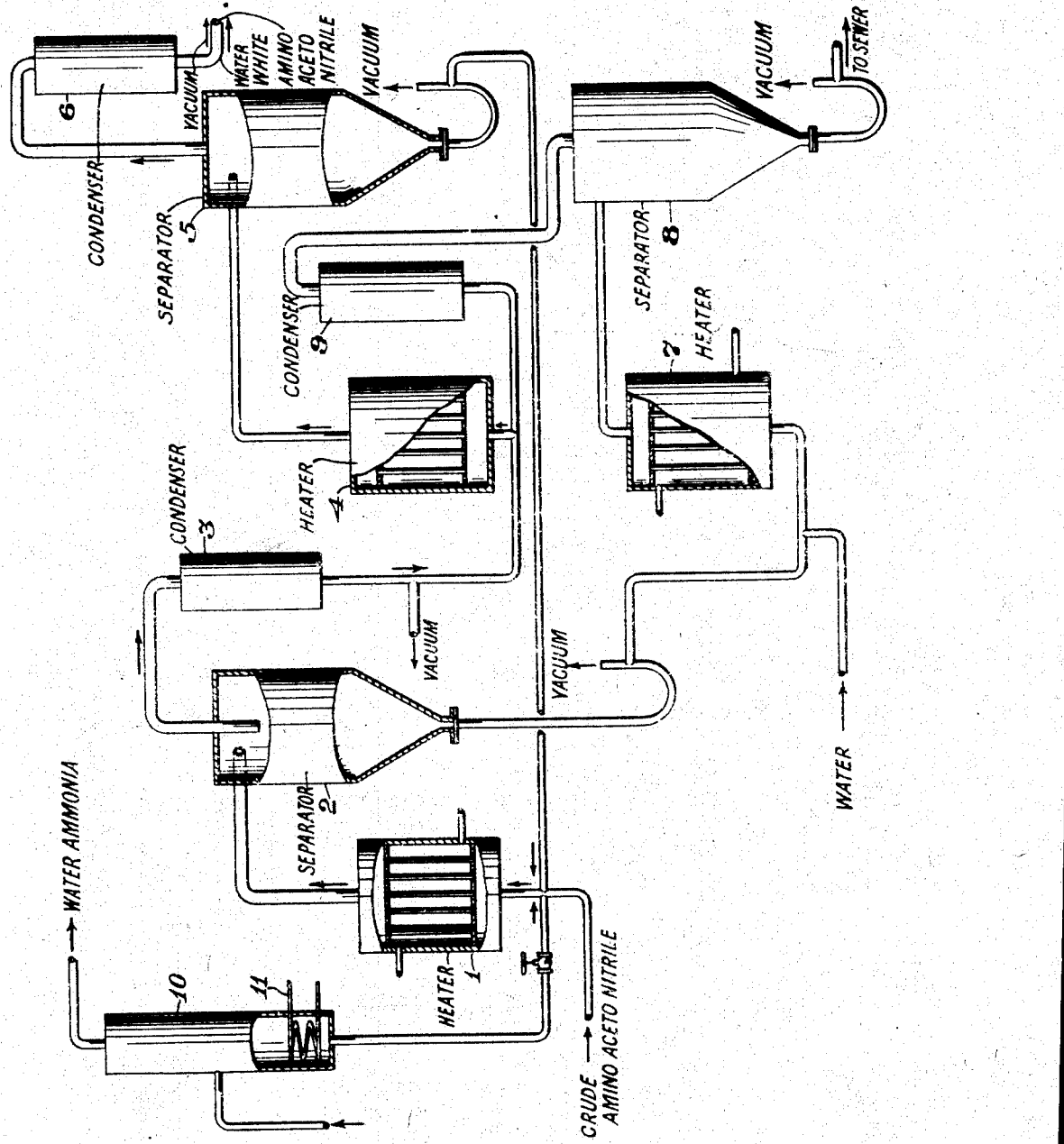

2,425,661

UNITED STATES PATENT OFFICE 2,425,661

PURIFICATION OF AMINOACETONITRILE BY VACUUM DISTILLATION

Arthur G. Weber and Clarence D. Bell, Wilmington, Del., assignors to E. I. du Pont de Nemours & Company, Wilmington, Del., a corporation of Delaware Application August 22, 1944, Serial No. 550,531

7 Claims. (Cl. 202—52)

This invention relates to an improved method for producing aminoacetonitrile and more particularly to the recovery of aminoacetonitrile from the crude reaction product obtained by reacting formaldehyde cyanhydrin with ammonia.

It is known that aminoacetonitrile can be made by the interaction of formaldehyde cyanhydrin (hydroxyacetonitrile) with ammonia. The ammonia is added to the cyanhydrin in an aqueous or alcoholic solution and in accord with the art it is stated that aminoacetonitrile may be obtained in normal theoretical yield. No description has been found in the art, however, describing how the aminoacetonitrile is recovered from the crude reaction mixture, and while a reaction mixture may on analysis show theoretical yields, such a showing has no real significance if the desired product cannot be used because of the many contaminating by-products produced with it which cannot be separated satisfactorily from the crude reaction mixture.

Normally liquid components of liquid mixtures can easily be separated by a train of distillation columns if the boiling points of the constituents present are as far apart as they are in the crude product from the reaction of formaldehyde cyanhydrin and ammonia. The crude products from this reaction, however, cannot readily be so separated from the aminoacetonitrile because of the unstable nature of the nitrile. If the crude product is fed directly to a vacuum distillation column, the by-products together with the decomposition products will soon plug the column and make it inoperable. Furthermore, pure aminoacetonitrile, suitable for hydrogenation has not heretofore been obtained principally because the low boiling decomposition products of the aminoacetonitrile continuously form during the distillation and pass overhead to contaminate the aminoacetonitrile product. The refining system described herein overcomes these difficulties.

An object of the present invention is to provide an improved process for the preparation of pure aminoacetonitrile. A further object of the invention is to provide a process for the recovery of aminoacetonitrile from the crude reaction product obtained by the interaction of formaldehyde cyanhydrin with ammonia. Yet another object is to provide a recovery process for separating an aqueous solution of aminoacetonitrile from solutions containing it as well as contaminating substances. A still further object is to provide a method whereby an aqueous solution of aminoacetonitrile suitable for hydrogenation can be separated from the crude reaction product derived from the amination of formaldehyde cyanhydrin. A further object is to provide a process for preparing anhydrous aminoacetonitrile. Other objects and advantages of the invention will hereinafter appear.

The above objects are realized in accord with this invention by subjecting an aqueous solution containing aminoacetonitrile, such as the crude reaction product of the amination of formaldehyde cyanhydrin, to a series of operations which involve heating the aqueous solution to vaporize the water and the major portion of the aminoacetonitrile, and substantially immediately thereafter separating the unvaporized liquids present from the vapors of aminoacetonitrile and water. This is accomplished by continuously subjecting a stream of the aqueous solution of aminoacetonitrile to a heating step which rapidly vaporizes the water and most of the aminoacetonitrile, leaving the other constituents present in the liquid phase. The mixture of liquid and vapor is passed from the heating step substantially as rapidly as the vapor is formed into a liquid-vapor separator of the separation step, wherein the vapors are substantially completely separated from the liquids. If desired, the vapors may be condensed, again heated and separated in a second series of operations similar to the first. The liquids and/or vapors separated in the first or second series of operations may be subsequently treated in a similar manner to effect completely separation.

A principal feature of the invention involves passing a relatively small volume as, for example, a stream of the liquid into a heater, wherein the liquid is rapidly heated. This can be accomplished by heating a portion of a tube through which the liquid is passing. As the aminoacetonitrile is vaporized, it increases the volume of the materials in the tube, and accordingly greatly increases the flow through the tube. From the heating tube the vapor-liquid mixture passes to a chamber in which the vapors and liquids are separated. Inasmuch as aminoacetonitrile decomposes rapidly at elevated temperatures in both the liquid and vapor phase and, moreover, as the amount of aminoacetonitrile decomposing in the refining system increases both as the time of heating is increased and as the boiling point of the liquid in the heater is raised, the length of time required to vaporize the water and aminoacetonitrile should be as short as possible and the vaporization should be carried out at as low a pressure as practical.

The process is more readily visualized by reference to the accompanying drawing which diagrammatically illustrates the process.

A crude reaction mixture obtained directly from the amination of formaldehyde cyanhydrin containing aminoacetonitrile, water, and other products of the reaction is introduced into the heater 1, within which the mixture is heated sufficiently to vaporize all of the water and most of the aminoacetonitrile. The resulting mixture of liquid and vapor passes tangentially into the separator 2, which is similar in construction to a cyclone separator, the liquid being discharged from the bottom, the vapors from the top. The vapors containing a substantial proportion of the aminoacetonitrile and water are liquified in the condenser 3, are passed on to a second heater 4 and a second separator 5, wherein the same series of processes effected in the first stage is carried out. The vapors from the second stage pass into the condenser 6, from which the liquid product is passed to storage. The liquid from separator 5 may, if desired, be returned as indicated in the drawing to the first stage to recover its aminoacetonitrile content, while the liquid from separator 2 is passed into a third stage illustrated by heater 7, wherein the liquid is also heated to vaporize the aminoacetonitrile, and the liquid and vapors separated in separator 8. Prior to being introduced into this stage, water is added before heating in order to aid in the separation. The vapor from the third stage is liquified in condenser 9 and the condensate preferably returned to the second stage for further refining. The arrangement of the flows between the various heaters and condensers may be varied to suit the operating conditions. For example, the vapor from the third separator 8 may be condensed and introduced to the first heater 1 instead of the second heater 4, or the liquid from the second separator 5 may be introduced to the third heater 7 instead of the first heater 1. When there is not much surging in the first heater 1, this heater with separator 2 may give excellent quality aminoacetonitrile without further treatment. In this case, the vapor from the first separator 2 is collected as product without further treatment and the vapor from the third separator 8 is condensed and either added to the product or recycled to the first heater 1.

Water addition need not be confined to the third heater 7, but may also be added to the first and second heaters 1 and 2, thus improving their recovery. Normally, however, the improvement in nitrile recovery yield is not justified if the product is to be directly hydrogenated, because of the extra cost of hydrogenating a more dilute nitrile solution. Vacuum is preferably applied to the system at the liquid outlets of the separators and at the exits of the condensers by ordinary means not shown.

When purifying the crude reaction mixture from the amination of formaldehyde cyanhydrin, some ammonia is present, which may, if desired, be separated by evaporation before the mixture is introduced into the purifying units of this invention. The crude reaction mixture, free from solids and containing less than 10% ammonia, is introduced into the system of heaters, separators, and condensers which are maintained at the lowest possible pressure allowing steady flow of materials through the system. For example, it has been found desirable to effect the separation in the first two stages at a pressure of about 20 to about 80 mm. and a temperature between about 65° C. and about 85° C., and the separation in the third stage at a pressure of about 5 to about 30 mm. and a temperature between about 55° and about 95° C. Adequate heating is provided by jacketing the heating zones with 2–15 pounds per square inch of steam or by other means giving an external temperature of about 110° C.

More specifically, the above process may be conducted, in the equipment described in the example, by introducing into the system as illustrated in the drawing 5.1 parts per hour of a crude reaction mixture obtained from the amination of formaldehyde cyanhydrin. To this mixture, 0.75 part per hour of condensed vapors from the second stage of the reaction, e. g., from separator 5 are added, and the resulting composite mixture introduced into the heater 1, wherein it is heated to a temperature between 65 and 85° C. under a pressure of approximately 40 mm. provided by any suitable means. From this heater the vapor-liquid mixture is introduced directly into the cyclone separator 2, which is maintained at substantially the same pressure. Approximately 3.06 parts per hour of vapors issue from this separator, are liquified in condenser 3 and are passed to the second stage of the process together with 3.19 parts per hour of condensed vapor from condenser 9, wherein they are subjected to substantially the same conditions to which they were subjected in the first stage. The vapors from the second stage are removed at a rate of approximately 5.5 parts per hour, are condensed at 6 and withdrawn from the system as a water-white aqueous solution of aminoacetonitrile. The liquid from separator 5 constituting about 0.75 part per hour is returned to the heater 1 of the first stage. The liquid from the first stage constituting approximately 2.59 parts per hour are introduced, after the addition of 1 (although from 0.25 to 3 parts may be added if desired) part of water per hour, into heater 7 of the third stage, and from the separator 8 of this stage 3.19 parts per hour of the vapors are withdrawn and returned after condensation at 9 to heater 4 of the second stage. Approximately 0.4 part per hour of liquid is discharged from the third stage and, if desired, may be treated for the small amount of aminoacetonitrile retained therein.

A preferred embodiment of the purification step of the invention is illustrated by this example in which parts are by weight unless otherwise indicated. The crude highly colored reaction mixture, containing about 50% of water and about 50% of aminoacetonitrile and a mixture of contaminating products, obtained by the amination of substantially equimolar weights of formaldehyde cyanhydrin and water, is heated to about 70° C. at atmospheric pressure to drive off most of the ammonia. The resulting liquid contains about 5% ammonia and is cooled to from 5 to 10° C., filtered and then fed at the rate of about 0.75 foot per minute to the first of three separation stages.

Each heating section consists of a jacketed stainless steel tubular heater 6' in length and ½" I. D. followed by a 5" I. D. x 8" long cyclone separator. The time of contact in the heaters of each stage is less than 6 minutes and is preferably less than 3 minutes. The vapor from the first stage is condensed and fed to a second stage similar to the first. The liquid from the first stage is fed to a third stage along with 0.08 lb. of water per pound of the crude nitrile introduced to the refining system. The vapor from the third stage is condensed and fed to the second, while the liquid is run to waste. The vapor from the second stage is condensed and sent to products storage and the liquid is recycled to the first separation stage. The operating conditions are:

| Cyclone Separator[1] | Feed | Pressure, mm. Hg. | Heat Temp., °C. |
|---|---|---|---|
| 2 | Crude aminoacetonitrile and No. 5 liquid. | 40 | 75 |
| 5 | Condensed vapor from 2 and 8. | 40 | 72 |
| 8 | Liquid from 2 and water. | 15–25 | 80 |

[1] Numerals refer to corresponding separators in the drawing.

The pressure and temperature in the heater of each stage is substantially the same as the respective pressure and temperature in the cyclone separator of that stage. The condensed vapors from the second stage gives an aqueous solution of a pure water-white aminoacetonitrile. Inasmuch as it is free from tarry materials, it can be catalytically hydrogenated directly to ethylene diamine in excellent yields and with long catalyst life.

The process of the invention may likewise be employed for the preparation of anhydrous aminoacetonitrile. For example, the crude reaction mixture obtained by the amination of formaldehyde cyanhydrin is passed into a water removal column 10, which is heated by means of the steam-heated coil 11 to distill off all of the water and ammonia present. The water-free product is continuously passed into the system and subjected to substantially the same conditions of pressure and temperature used in the treatment of aqueous aminoacetonitrile. The flow of crude anhydrous aminoacetonitrile is the same as described above except that the vapor from separator 8 containing water is sent back to the water removal column 10 instead of being condensed and sent to heater 4. As a result of this treatment, anhydrous aminoacetonitrile can be obtained not only free from water, but also substantially free from contaminating substances resulting from the formaldehyde cyanhydrin amination reaction or from decomposition of the aminoacetonitrile.

We claim:

1. In a process for the purification of aminoacetonitrile contained in a crude aqueous liquid mixture, the steps which comprise heating the crude liquid mixture to a temperature between 55 and 95° C. for not more than three minutes under a pressure of 5 to 80 mm. until a major portion of the aminoacetonitrile has been vaporized, passing the resulting liquid-vapor mixture into a separating zone and therein separating the aminoacetonitrile vapor from the liquid-vapor mixture.

2. In a process for the purification of aminoacetonitrile contained in a crude liquid mixture, the steps which comprise passing a crude aqueous liquid mixture into a tubular heating zone, and vaporizing therein a major portion of the aminoacetonitrile under a pressure of from 5 to 80 mm. and a temperature of between about 65 to about 95° C. within not more than three minutes, thereafter passing the liquid-vapor mixture into a space of greater volume wherein the vapors and liquids are separated.

3. In a process for the purification of aminoacetonitrile contained in a crude liquid mixture, the steps which comprise passing a crude aqueous liquid mixture through a plurality of heating and separating stages, each one of which involves a tubular heating zone, and vaporizing therein a major portion of the aminoacetonitrile under a pressure of from 5 to 80 mm. and a temperature of between about 55 to about 95° C. within not more than three minutes, thereafter passing the liquid-vapor mixture into a space of greater volume wherein the vapors and liquids are separated.

4. In a process for the purification of aminoacetonitrile contained in a crude liquid mixture, the steps which comprise effecting the purification in a plurality of stages, in the first stage passing a relatively small volume of the crude aqueous liquid mixture into a zone heated to a temperature between about 65 to about 95° C. at a pressure of less than 80 mm., and so constructed that a major portion of the aminoacetonitrile is vaporized within not more than three minutes, and thereafter passing the liquid-vapor mixture into a zone of greater volume wherein the vapors and liquids are separated, passing the vapors from the first stage into a heating zone and separating zone of the second stage, and therein subjecting the mixture to substantially the same conditions of temperature and pressure employed in the first stage, passing the liquids from the first stage to a third stage heating zone, wherein this liquid is subjected to a lower pressure than employed in the first stage and to a temperature sufficient under the pressure superimposed to vaporize a major portion of the aminoacetonitrile contained therein, returning the vapors of the third stage after separation and condensation to the second stage heating zone and the liquids from the second stage to the first stage heating zone, whereby substantially all contaminating constituents other than water are removed from the said crude liquid mixture.

5. In a process for the purification of aminoacetonitrile from a mixture thereof dissolved in water containing decomposition products of the aminoacetonitrile and by-products of the formaldehyde cyanhydrin-ammonia reaction, the steps which comprise passing the mixture into a tubular reaction zone, vaporizing therein a major portion of the aminoacetonitrile and water under a pressure of from 5 to 60 mm. and a temperature of between 65 and 85° C. for not more than three minutes, thereafter passing the resulting liquid-vapor mixture into a zone of greater volume than the heating zone wherein the aminoacetonitrile and water are separated from the unvaporized constituents and thereafter condensing the vaporized aminoacetonitrile.

6. In a process for the purification of aminoacetonitrile contained in a crude aqueous liquid mixture, the steps which comprise passing the crude aqueous liquid mixture under reduced pressure through a tubular heating zone in not more than 3 minutes the zone being maintained at a temperature below 95° C. and sufficient to vaporize a major portion of the aminoacetonitrile during its passage through the zone, passing the resulting liquid-vapor mixture into a separating zone and therein separating the aminoacetonitrile vapor from the liquid-vapor mixture.

7. The process of claim 6 in which the aminoacetonitrile is subjected in the tubular heating zone to a pressure below 80 millimeters.

ARTHUR G. WEBER.
CLARENCE D. BELL.

(References on following page)

REFERENCES CITED

The following references are of record in the file of this patent:

UNITED STATES PATENTS

| Number | Name | Date |
|---|---|---|
| 2,274,801 | Mills | Mar. 3, 1942 |
| 2,085,679 | Gluud et al. | June 29, 1937 |
| 2,054,096 | Potts et al. | Sept. 15, 1936 |

FOREIGN PATENTS

| Number | Country | Date |
|---|---|---|
| 832,259 | France | June 27, 1938 |

OTHER REFERENCES

Badger and McCabe, "Elements of Chemical Engineering," second edition, published 1936 by McGraw-Hill Book Co., Inc., New York, N. Y., 1936. (Copy in Library of Congress, pages 177–184.)